Figure 1:
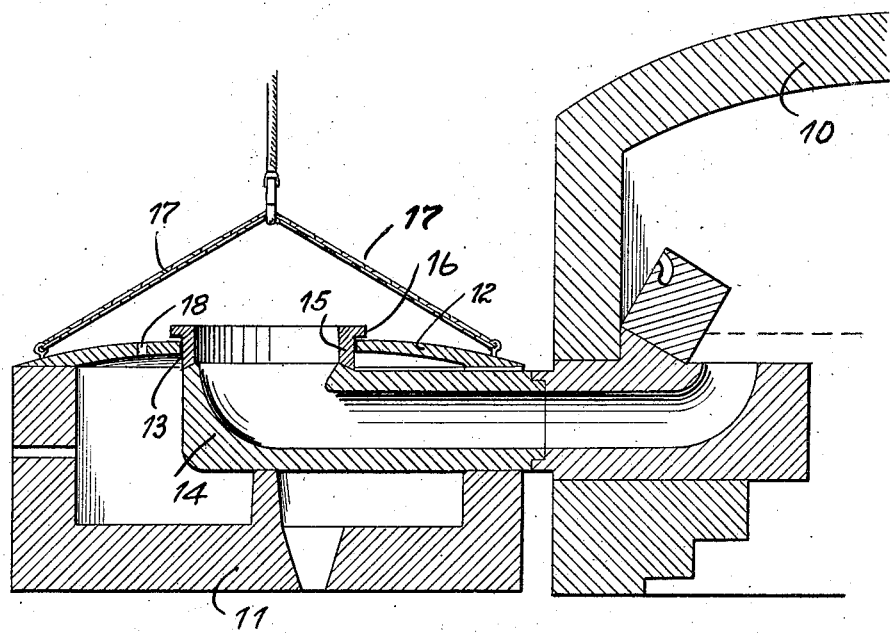

W. A. JONES.
GLASS DRAWING APPARATUS.
APPLICATION FILED MAR. 7, 1913.

1,083,616.

Patented Jan. 6, 1914.

Witnesses
M. S. Watson
Henry T. Bright

Inventor
W. A. Jones
By Chandler & Chandler
Attorneys

UNITED STATES PATENT OFFICE.

WALTER A. JONES, OF COLUMBUS, OHIO.

GLASS-DRAWING APPARATUS.

1,083,616.  Specification of Letters Patent.  Patented Jan. 6, 1914.

Application filed March 7, 1913. Serial No. 752,739.

*To all whom it may concern:*

Be it known that I, WALTER A. JONES, a citizen of the United States, residing at Columbus, in the county of Franklin, State of Ohio, have invented certain new and useful Improvements in Glass-Drawing Apparatus; and I do hereby declare the following to be a full, clear, and exact description of the invention, such as will enable others skilled in the art to which it appertains to make and use the same.

This invention relates to glass drawing apparatus, and particularly to an improved construction for effecting the draining of a continuously supplied drawing pot after each drawing operation.

It has been found in practice that when the draining ring, of the type disclosed in U. S. Letters Patent 1,050,544 granted to me January 14, 1913, is elevated to drain the pot the temperature thereof will be materially decreased so that upon reapplication of the ring the glass rising against the inner wall thereof will become chilled with objectionable results in the drawing operation following.

It is therefore the object of the present invention to provide an improved construction whereby the draining ring will be maintained at a desired temperature during the removal and application thereof from and to the drawing pot.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 2:
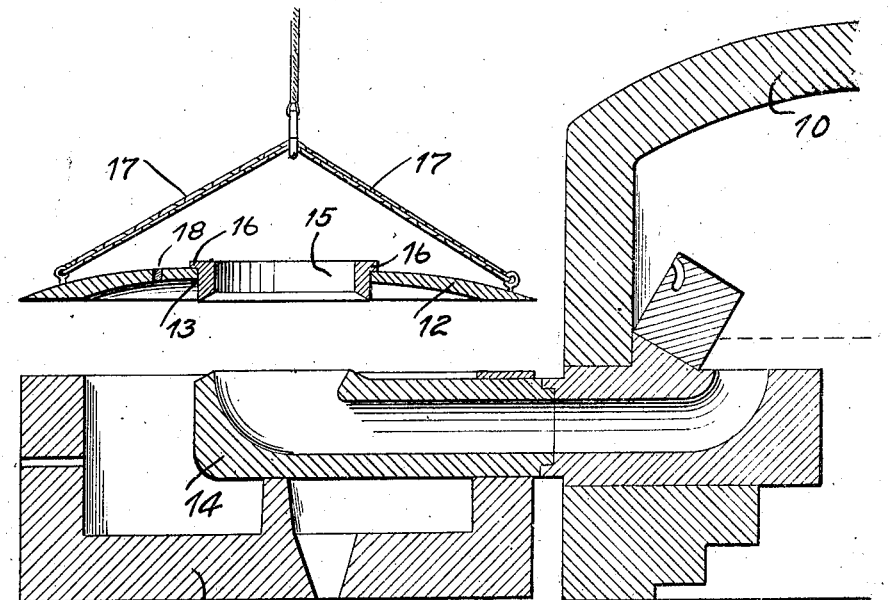

Figure 1 is a vertical section of a glass tank and an outworking furnace with the invention embodied therein, and Fig. 2, a fragment of what is shown in Fig. 1 with the draining ring elevated.

Referring to the drawings 10 indicates a glass tank and 11 an outworking furnace disposed adjacent said tank. The furnace 11 is provided with a removable dome shaped cover 12 having a central opening 13 therein. Disposed within the furnace 11 is a drawing pot 14 which is suitably connected with the interior of the tank 10 to be continuously supplied with molten glass. The mouth of the pipe 14 is disposed in line with the opening 13 and the upper end of the wall of said pot is formed by a ring 15 which extends through the opening 13 and is provided at its upper end with a lateral flange 16 which overlies the cover 12. A suitable hoisting mechanism (not shown) is attached to the cover 12 by means of cables 17 so as to provide for the elevation of the cover when desired. The cover 12 is provided with a small opening 18 arranged at one side of the opening 13 for the purpose of permitting heat from the interior of the furnace 11 to escape to the atmosphere when the cover 12 is closed.

If it is desired to drain the pot 14 it is only necessary to elevate the cover 12. During this elevation of the cover the latter will engage the flange 16 and lift the ring 15 so as to permit the desired draining. When the ring 15 is thus lifted the heat ascending from the furnace 11 will be trapped and directed against said ring by the inner dome shaped wall of the cover and thus provide against the chilling of the rings 15 and the disadvantageous results arising from such chilling when the ring is reapplied by lowering the cover 12 to closed position. If desired the opening 18 can be closed by means of a suitable stopper when the cover 12 is lifted so as to provide against the escape of any heat directly through the cover.

What I claim is:—

1. The combination with a glass tank, of an outworking furnace adjacent said tank, said furnace including a removable dome shaped top provided with a central opening, a drawing pot disposed in said furnace and having its mouth in line with the opening in the top, means for continuously supplying the pot with molten glass from the tank, a removable ring forming the upper end of the wall of the pot and extending through the opening in the top, and a lateral flange on the upper end of the ring overlying the cover whereby the elevation of the top will elevate the ring and the inner dome shaped wall of the top serving, when the latter is elevated, to catch the ascending heat and direct same against and through the ring.

2. The combination of a furnace having a removable dome shaped top provided with an opening, a drawing pot in the furnace having its mouth in line with the opening in the top, a removable ring forming the upper end of the wall of the pot and extending through the opening in the top, and a lateral flange on the upper end of the ring adapted to be engaged by the top during elevation of the latter to simultaneously elevate the ring, the inner dome shaped wall of the top serving when the latter is elevated to catch the ascending heat and direct same against and through the ring.

In testimony whereof, I affix my signature, in the presence of two witnesses.

WALTER A. JONES.

Witnesses:
 CHAS. M. KLING,
 AMELIA FAEHULE.

Copies of this patent may be obtained for five cents each, by addressing the "Commissioner of Patents, Washington, D. C."